(12) United States Patent
Kishida

(10) Patent No.: US 8,976,398 B2
(45) Date of Patent: Mar. 10, 2015

(54) INFORMATION PROCESSING APPARATUS, INFORMATION PROCESSING METHOD, AND PROGRAM

(75) Inventor: Akira Kishida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/116,993

(22) PCT Filed: May 15, 2012

(86) PCT No.: PCT/JP2012/003162
§ 371 (c)(1),
(2), (4) Date: Nov. 11, 2013

(87) PCT Pub. No.: WO2012/157256
PCT Pub. Date: Nov. 22, 2012

(65) Prior Publication Data
US 2014/0098403 A1    Apr. 10, 2014

(30) Foreign Application Priority Data

May 19, 2011   (JP) .................................. 2011-112600

(51) Int. Cl.
*G06F 3/12* (2006.01)
*G06K 15/00* (2006.01)
*G06F 9/44* (2006.01)

(52) U.S. Cl.
CPC ............ *G06F 3/1297* (2013.01); *G06F 3/1204* (2013.01); *G06F 3/1225* (2013.01); *G06F 3/1232* (2013.01); *G06F 3/1285* (2013.01); *G06F 9/4411* (2013.01); *G06F 3/1236* (2013.01)
USPC ......... 358/1.15; 358/1.1; 358/1.13; 358/1.14; 358/1.16

(58) Field of Classification Search
None
See application file for complete search history.

(56) References Cited

U.S. PATENT DOCUMENTS

| | | | | |
|---|---|---|---|---|
| 6,025,925 A * | 2/2000 | Davidson et al. | ............ | 358/1.15 |
| 6,112,256 A * | 8/2000 | Goffinet et al. | .................... | 710/8 |
| 6,567,175 B1 * | 5/2003 | Lee | ............... | 358/1.14 |
| 6,825,944 B1 * | 11/2004 | Noda | ........................... | 358/1.15 |
| 7,715,027 B2 * | 5/2010 | Ferlitsch | ...................... | 358/1.13 |
| 7,728,999 B2 * | 6/2010 | White et al. | .................. | 358/1.15 |
| 8,228,528 B2 * | 7/2012 | Aoki | ............................ | 358/1.15 |
| 2003/0093768 A1 * | 5/2003 | Suzuki | .......................... | 717/100 |

FOREIGN PATENT DOCUMENTS

| | | | |
|---|---|---|---|
| JP | 2001-117834 A | 4/2001 | |
| JP | 2005-309617 A | 11/2005 | |

* cited by examiner

*Primary Examiner* — Satwant Singh
(74) *Attorney, Agent, or Firm* — Canon USA, Inc. IP Division

(57) ABSTRACT

An information processing apparatus activates an installer by a basic printer driver, transmits information of an image forming apparatus to automatically install and activate a printer adaptor module, and automatically prepares a second extension printer driver, thereby achieving original bidirectional communication.

6 Claims, 15 Drawing Sheets

AFTER PRINTER ADAPTOR SETTING

INFORMATION PROCESSING APPARATUS, INFORMATION PROCESSING METHOD, AND PROGRAM

TECHNICAL FIELD

The present invention relates to an information processing apparatus, an information processing method, and a program, which enable use of conventional functions which has been conventionally achieved in original bidirectional communication.

BACKGROUND ART

To use peripheral devices such as an image forming apparatus from the information processing apparatus, a specific device driver (printer driver in the case of the image forming apparatus) corresponding to the peripheral devices must generally be installed in a processing system (hereinafter, operating system (OS)) that operates on the information processing apparatus. When the image forming apparatus is used, the printer driver is activated from an application, setting necessary for printing is carried out, and the image forming apparatus is driven. Image data acquired from the application is then transferred to the image forming apparatus. This enables printing of an image on paper.

In communication between the image forming apparatus and the printer driver, not only print data is transmitted from the printer driver, but also a print communication protocol utilizing information from the apparatus side is widely used. By this protocol, even in an image forming apparatus where a memory loadage is small, the printer driver can always check the state of a memory as information to achieve stable printing execution and realize display of abundant apparatus state information to be checked on the information processing apparatus side and a message to a user. Such a system has been widely commercialized and used.

Further, as discussed in Japanese Patent Application Laid-Open No. 2005-309617, there has been proposed an idea of achieving installation and environment construction by matching image forming apparatus and printer driver functions, which are equivalent in arbitrary OSs, with any OS. This idea is not realized by an operation at the printer driver but by accessing the printer adaptor where an apparatus directly connected to the image forming apparatus or via a network serves as a host.

However, as illustrated in FIG. 15A, there is a printing system including a basic printer driver where only a standard print protocol operates. In such a system, functions concerning memory checking, calibration, and adaptation to the image forming apparatus information, which have been realized by the independent communication protocol, cannot be achieved.

In the printer conversion system discussed in Japanese Patent Application Laid-Open No. 2005-309617, setting such as connection of a printer adaptor to the image forming apparatus must be made beforehand for bidirectional communication.

To address the above problems automatic construction of a system is necessary that needs no presetting for the printer adaptor, and can easily use printing functions using bidirectional communication similar to that of the conventional case, which is realized only by carrying out the conventional work of installing the printer driver into the image forming apparatus by the user. Further, even when there is a printer adaptor that has been already used in a local network, a system must be achieved, which automatically detects the apparatus, and notifies the user of its result as a choice of a usable environment, and the user can automatically use it.

CITATION LIST

Patent Literature

PTL 1: Japanese Patent Application Laid-Open No. 2005-309617

SUMMARY OF INVENTION

According to an aspect of the present invention, an information processing apparatus includes: an acquisition unit configured to acquire information of a target image forming apparatus from a basic printer driver; an activation unit configured to install and activate a printer adaptor for achieving bidirectional communication based on the information of the target image forming apparatus acquired by the acquisition unit; and a creation unit configured to create an environment where an extension printer driver corresponding to the printer adaptor activated by the activation unit operates. The extension printer driver transmits print data to the printer adaptor according to a printing instruction from an application. The printer adaptor spools the print data, and transmits data to the image forming apparatus while executing original bidirectional communication.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

Exemplary embodiments described below are in no way limited to the present invention specified in appended claims, nor are all combinations of features of the exemplary embodiments essential to solutions of the invention.

A first exemplary embodiment of the present invention is described.

Figure 1A:
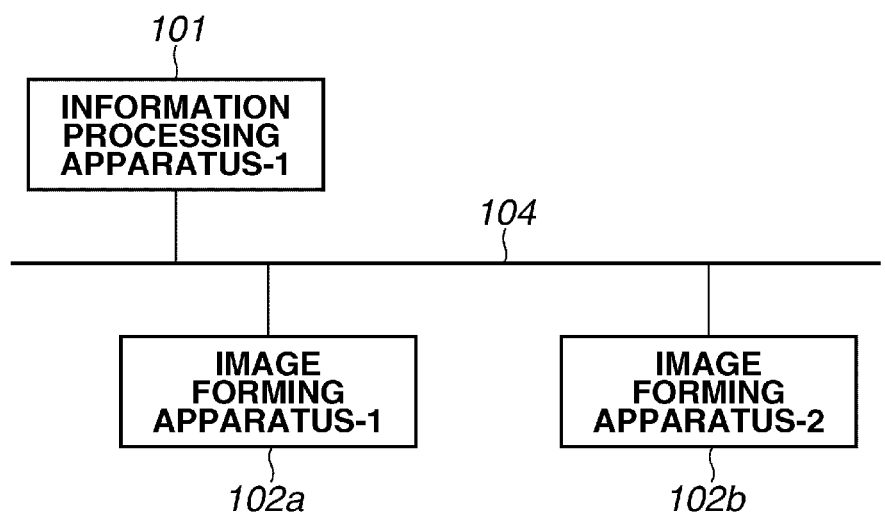
FIG. 1A is a block diagram illustrating a configuration of a system and apparatus configurations in an image processing apparatus and an image forming apparatus according to a first exemplary embodiment.

FIG. 1A is a block diagram schematically illustrating a configuration of a network system according to the first exemplary embodiment of the present invention. The network system includes an image processing apparatus 101, and a plurality of image forming apparatuses (102a, 102b, . . . ) that receives print data from the image processing apparatus 101 to execute printing. These apparatuses are interconnected via a local area network 104 based on Ethernet (registered trademark).

Figure 1B:
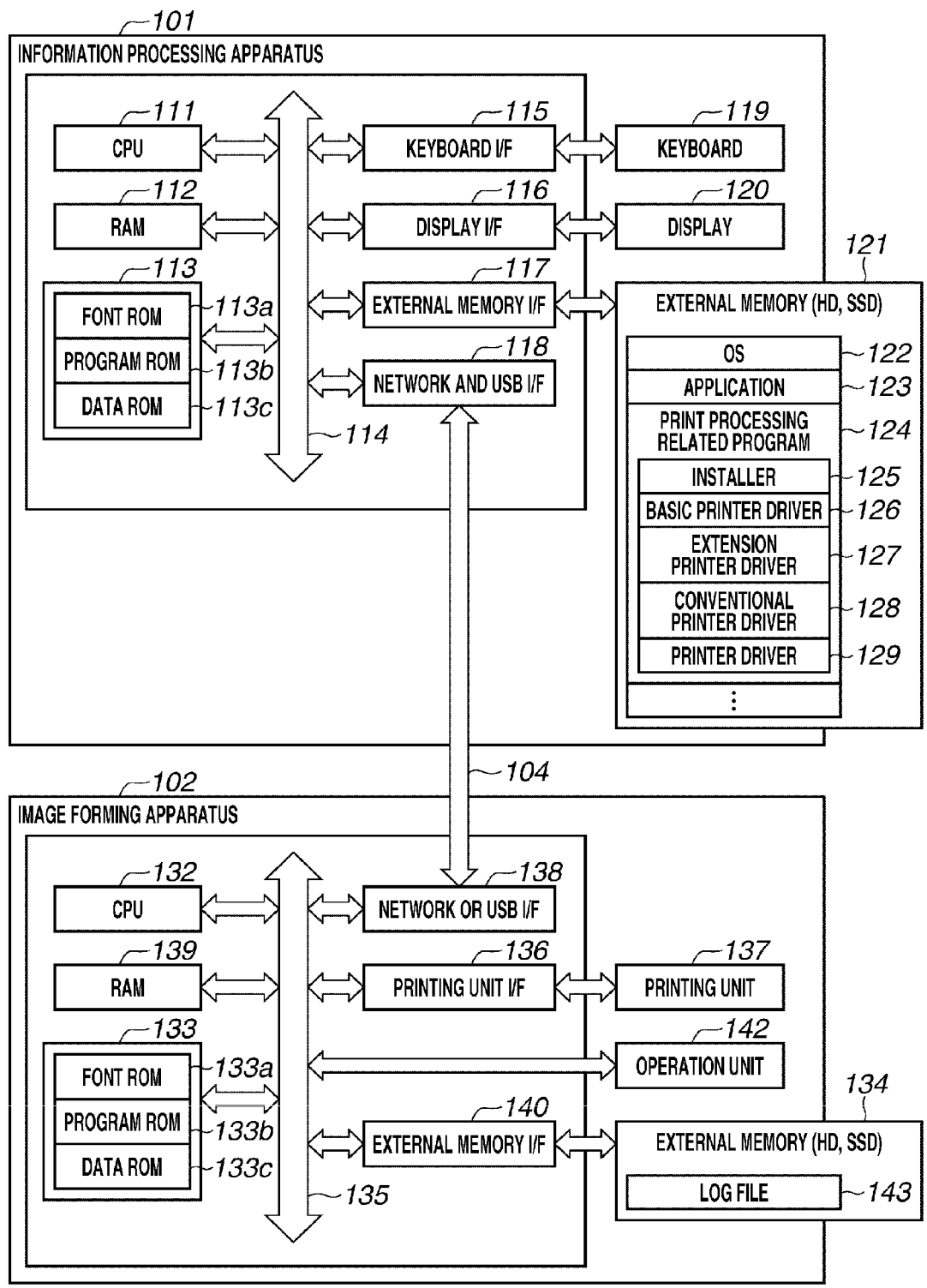
FIG. 1B is a block diagram illustrating a configuration of a system and apparatus configurations in an image processing apparatus and an image forming apparatus according to a first exemplary embodiment.

FIG. 1B is a block diagram illustrating apparatus configurations of the image processing apparatus 101 and the image forming apparatus 102. In the image processing apparatus 101, a central processing unit (CPU) 111 is in overall control of apparatuses connected to a system bus 122 according to a program stored in a random access memory (RAM) 112. The RAM 112 functions as a main memory or a work area for the CPU 111. A read-only memory (ROM) 113 stores various programs and data. A keyboard interface (I/F) 115 controls a key input from a keyboard 119 or a pointing device (touch panel, not illustrated). A display I/F 116 controls displaying on a display 120. An external memory I/F 121 controls access to an external memory 121 such as a flash memory or solid state disk (SSD). The external memory 121 stores various applications 123 such as an operating system program (OS) 122, and a printing processing related program 124.

Further, the external memory 121 functions as an information processing apparatus readable storage medium for storing a user file or an edit file (not illustrated). As the OS 122, Microsoft Windows is used. The printing processing related program 124 includes an installer 125, a basic printer driver 126, an extension printer driver 127, a conventional printer driver 128, and a printer adaptor 129 according to this exemplary embodiment.

The basic printer driver 126, which is driver software installable corresponding to the target image forming apparatus 102, does not support bidirectional communication other than a standard, which is a problem to be solved by this exemplary embodiment. To deal with an error where bidirectional communication cannot be executed when the basic printer driver 126 carries out standard bidirectional communication, there is installed a function of performing an operation described below. The target image forming apparatus supports the printer adaptor 129 described below while the extension printer driver 127 supports a conventional bidirectional communication method other than the standard. The conventional printer driver 128 supports the conventional bidirectional communication method.

The printer adaptor 129 is emulator software of an actual apparatus that behaves as a physical image forming apparatus by software unique to this exemplary embodiment. The printer adaptor 129 can enable the other actual image forming apparatus 102 to execute actual printing execution. A network and a universal serial bus (USB) I/F 118, which are connected to the image forming apparatus 102 via the network 104 or a local bus such as a USB, carries out communication control processing with the image forming apparatus 102.

Next, a configuration of the image forming apparatus 102 is described. A CPU 32 controls the entire operation of the image forming apparatus 102. A RAM 139 that functions as a main memory or a work area of the CPU 132 is used as an output information rasterization area or an environment data storage area. Further, the RAM 139 that includes a nonvolatile RAM (NVRAM) area is configured to increase a memory capacity by an optional RAM connected to an expansion port (not illustrated).

A ROM 133 includes a font ROM 133a for storing various fonts, a program ROM 133b for storing a control program to be executed by the CPU 132, and a data ROM 133c for storing various data. A network I/F 138 transmits and receives data to and from the image processing apparatus 101. A printing unit I/F 136 controls an interface with a printing unit 137 that is a printer engine. An external memory 134, access to which is controlled by an external memory I/F 140, includes a hard disk (HD) or a SSD connected as an option.

The external memory 134 stores font data, an emulation program, and form data. Further, the external memory 134 can store a log file 143. When the external memory 134 such as a hard disk is not connected, information used in the information processing apparatus 101 is stored in the data ROM 133c of the ROM 133. Not only one but also a plurality of external memories 134 can be included. For example, in addition to a built-in font, an optional font card, and an external memory storing a program for interpreting different printer control languages of a language system can be connected.

An operation unit 142 includes an operation panel to receive a user's operation. In the operation panel, an operation switch and a light emitting diode (LED) display (not illustrated) are arranged. The operation unit 142 can further include a NVRAM (not illustrated), and store printer mode setting information from the operation panel. The CPU 132 outputs an image signal as output information to the printing unit 137 via the printing unit I/F 136 based on the control program stored in the program ROM 133b of the ROM 133. The CPU 132 can communicate with the information processing apparatus 101 via the network or the USB I/F 138. Further, the CPU 132 can receive print data transmitted from the information processing apparatus 101, and communicate information in the image forming apparatus 102 to the information processing apparatus 101.

Figure 2:
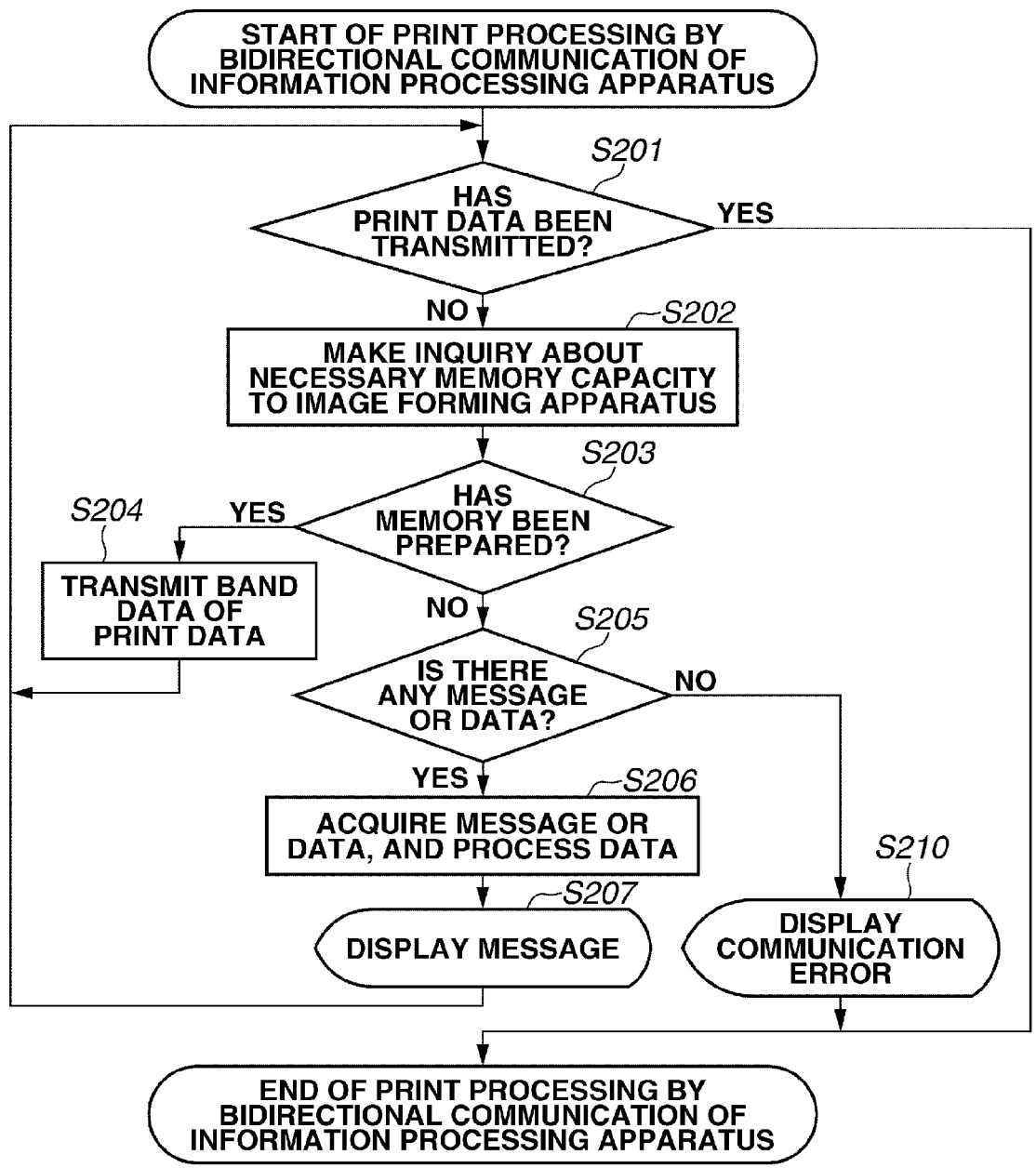
FIG. 2 is a flowchart illustrating an example of printing by a printer driver of a conventional bidirectional communication printing system.

FIG. 2 is a flowchart illustrating an example of a printing processing of the conventional printer driver 128 in the printing system of the conventional bidirectional communication method. In step S201, when the printing processing is currently executed, whether data has been already transmitted is checked. When transmission of print data has been ended (YES in step S201), an end message is transmitted from the image forming apparatus 102, and this processing is accordingly ended. When there is still print data (NO in step S201), the processing proceeds to step S202 to make an inquiry about whether a necessary memory area has been prepared, to the image forming apparatus 102.

Depending on an image forming apparatus, there is a limit on the amount of print data to be transmitted once. It is accordingly presupposed that certain band data be transmitted in all areas for the printing paper of the print data. When a sufficient memory area has been prepared (YES in step S203), the processing proceeds to step S204 to transmit the band data of the print data, and returns to step S201. When no sufficient memory has been prepared (NO in step S203), it means that there is information from the image forming apparatus in bidirectional communication. Therefore, in step S205, it is checked in the image forming apparatus whether there is a message.

When there is no message or data (NO in step S205), it is determined that a communication state is illegal, the processing proceeds to step S210 to display a communication error by the conventional printer driver 128. When there is a message (YES in step S205), the processing proceeds to step S206 to acquire the message or the data from the image forming apparatus 102, and executes data processing. Then, in step S207, the conventional printer driver 128 displays the message, and the processing returns to step S201.

Figure 3:
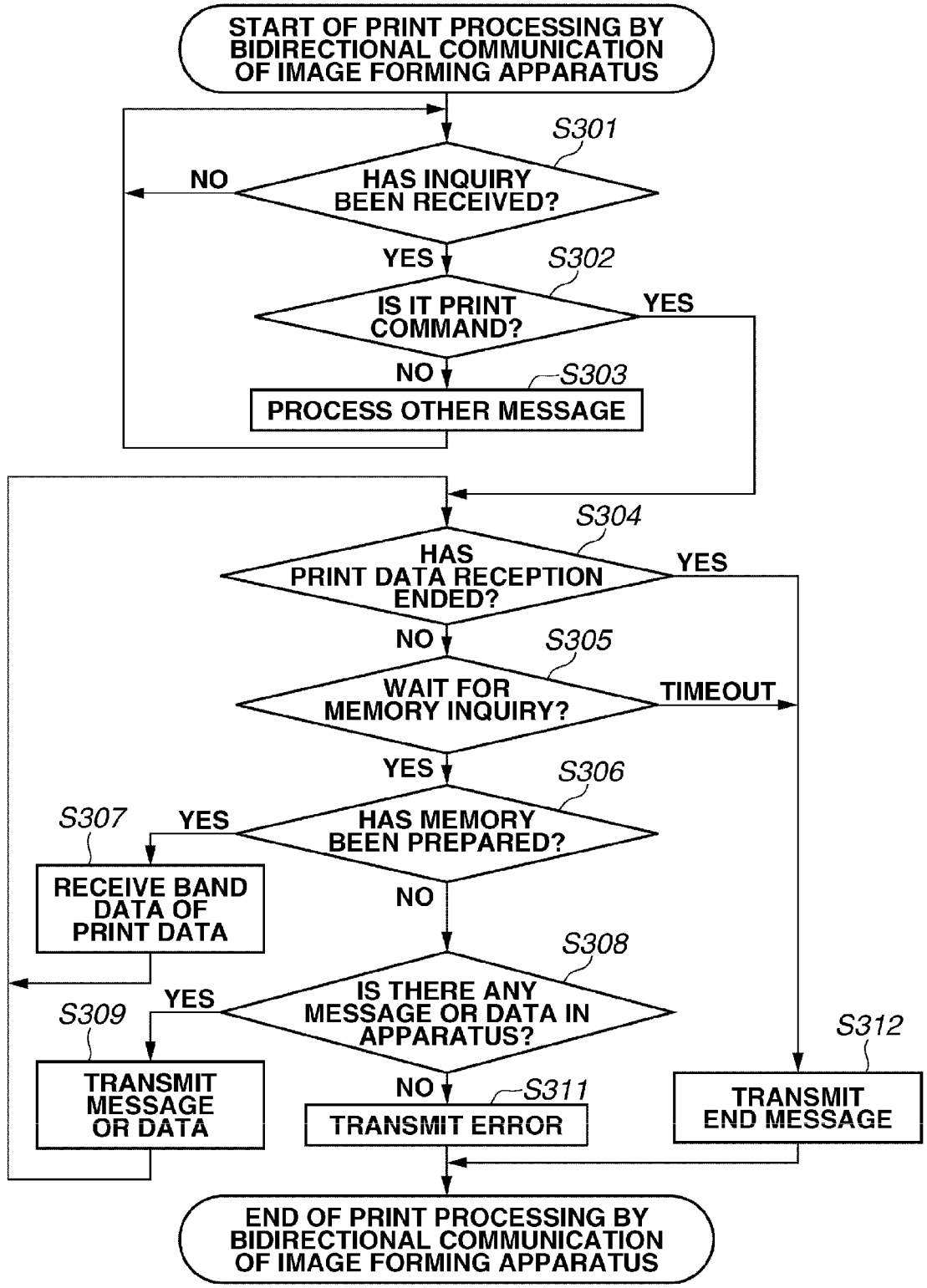
FIG. 3 is a flowchart illustrating an example of printing by an image forming apparatus of the conventional bidirectional communication printing system.

FIG. 3 is a flowchart illustrating an example of a printing processing of the image forming apparatus 102 in the printing system of the conventional bidirectional communication method. In step S301, whether an inquiry has come from the image forming apparatus 102 is continuously checked. When the inquiry has come (YES in step S301), the processing proceeds to step S302. In step S302, it is determined whether the inquiry is a printing command. When it is a printing command (YES in step S302), the processing proceeds to step S304. When not (NO in step S302), the processing proceeds to step S303.

In step S303, other message processing for executing necessary transfer by a conventional protocol is executed, and then the processing returns to step S301. Next, the processing executes a step when the inquiry is a printing command. In step S304, the end of the print data is determined in consideration whether reception of the print data has ended. When the end is determined (YES in step S304), the processing proceeds top step S312, and an end message is transmitted to the printer driver to end the processing. When the end of the print data is not determined (NO in step S304), the processing proceeds to step S305.

The processing then waits for an inquiry concerning a memory from the printer driver. When no inquiry comes for a fixed period of time, a timeout occurs and the processing proceeds to step S312. Then, an end message is transmitted to the printer driver to end the processing. When the inquiry about a memory comes (YES in step S305), the processing proceeds to step S306 to determine whether the memory in the RAM 139 of the image forming apparatus can respond to a request from the printer driver. When the memory is ready (YES in step S306), the processing proceeds to step S307 to receive the print data by band, and proceeds to step S304.

When the memory is not ready (NO in step S306), and when there is a message or data to be transmitted from the image forming apparatus 102 side, in step S309, the printer driver reads the message or the data from the memory area to transmit it to the information processing apparatus 101. When there is no message or data to be transmitted (NO in step S308), since the image forming apparatus 102 is in an abnormal state, in step S311, an error message is transmitted to the image forming apparatus 102 to end the processing.

Figure 4:
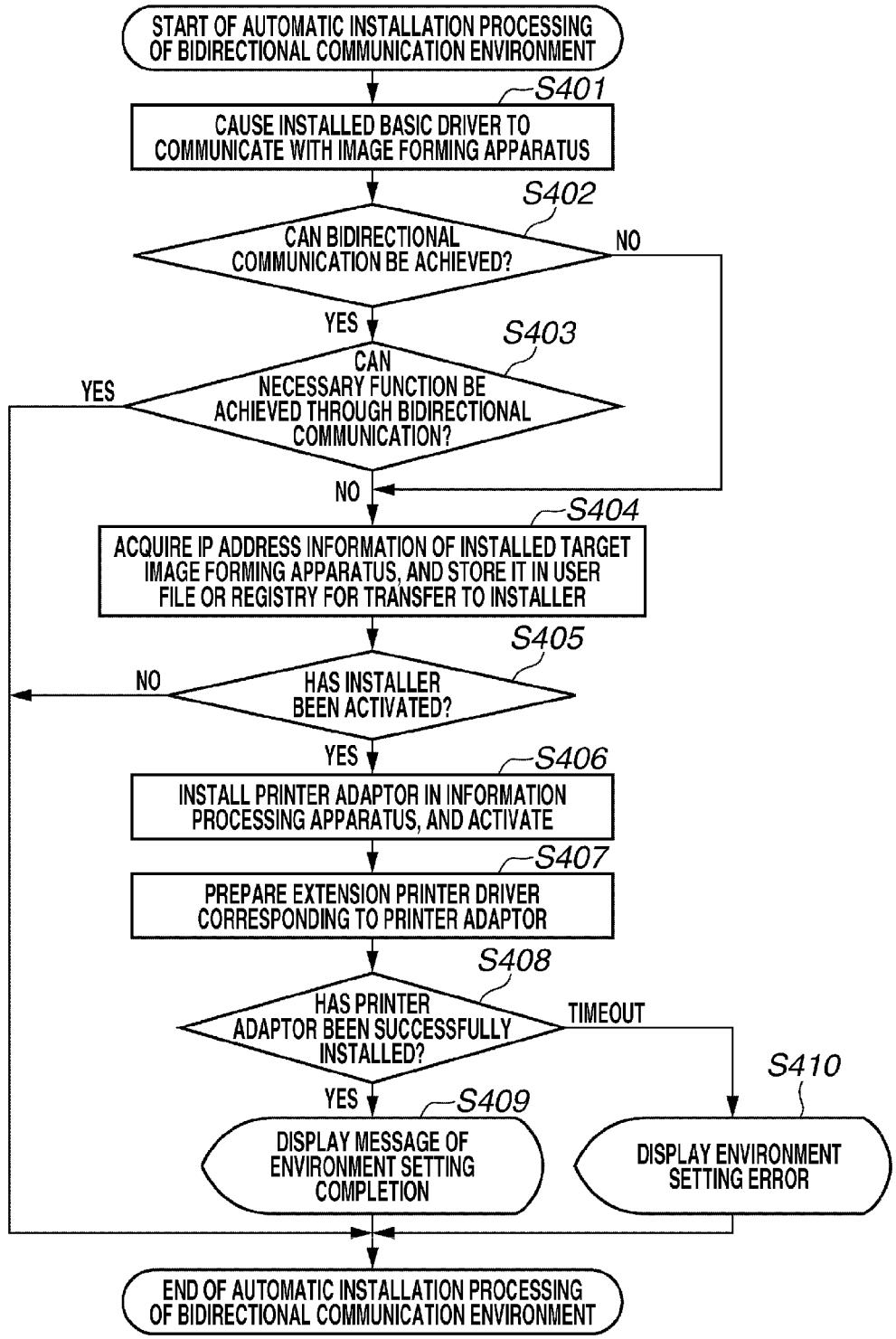
FIG. 4 is a flowchart illustrating an example of automatic installation processing of bidirectional communication environment according to this exemplary embodiment.

FIG. 4 is a flowchart illustrating an example of automatic installation processing to construct bidirectional communication environment of the basic printer driver 126 and the installer 125. As a precondition, to construct print setting of the image forming apparatus 102, in the OS operating on the CPU 111 in the information processing apparatus 101, the printer driver is installed by the conventional method. In this exemplary embodiment, the basic driver 126 is installed as the printer driver for the image forming apparatus 102, and the user executes installation processing of the basic driver 126 to start the processing.

In step S401, the installed basic printer driver 126 communicates with the image forming apparatus 102 immediately after the installation. In step S402, an inquiry is made to the image forming apparatus 102 by the standard bidirectional communication method. When an error occurs because the communication cannot be carried out, it means that the standard bidirectional communication method cannot be carried out (NO in step S402), and the processing proceeds to step S404. When a response comes from the image forming apparatus 102 (YES in step SD402), the processing proceeds to step S403.

In step S403, an inquiry is made about a return value of memory checking, which is a signal serving as a basis for the conventional bidirectional communication. When no return value comes, it is determined that complete communication based on the standard bidirectional communication has not been achieved. In step S403, when an operation is performed by the standard bidirectional communication, it means that the image forming apparatus 102 also supports the standard bidirectional communication, and thus the processing is ended. When the standard bidirectional communication cannot be achieved (NO in step S402 or S403), the processing proceeds to step S404.

In step S404, the basic printer driver 126 writes an IP address of the image forming apparatus 102 or information of a local port in the case of a local connection such as a USB, in a user file or a registry which the installer 125 can access. Then, in step S405, the basic printer driver 126 communicates a message to the installer 125 via the OS 122 to start automatic installation processing of the installer 125. When there is no response to the message for a fixed period of time or no installer process is found on the OS 122 (NO in step S405), the basic printer driver 126 ends the automatic installation processing. When the installer starts without any problems (YES in step S405), the processing proceeds to step S406.

The installer 125 extracts the information of the image forming apparatus (IP address of the target image forming apparatus or information of the local port in the case of a local connection such as a USB) from the registry. Then, printer adaptor software (emulator) suited to the port is installed to activate the printer adaptor. The activated printer adaptor is emulation to perform an operation similar to that of another image forming apparatus.

In step S407, the installer 125 creates an environment where the extension printer driver 127 operates, that is a second printer driver capable of achieving bidirectional communication corresponding to the image forming apparatus. In this exemplary embodiment, the installer 125 copies the file of the extension printer driver 127 to a suitable part of the OS 122, and creates a communication port having a setting for the printer adaptor 129 by a standard method of the OS 122.

Figure 6:
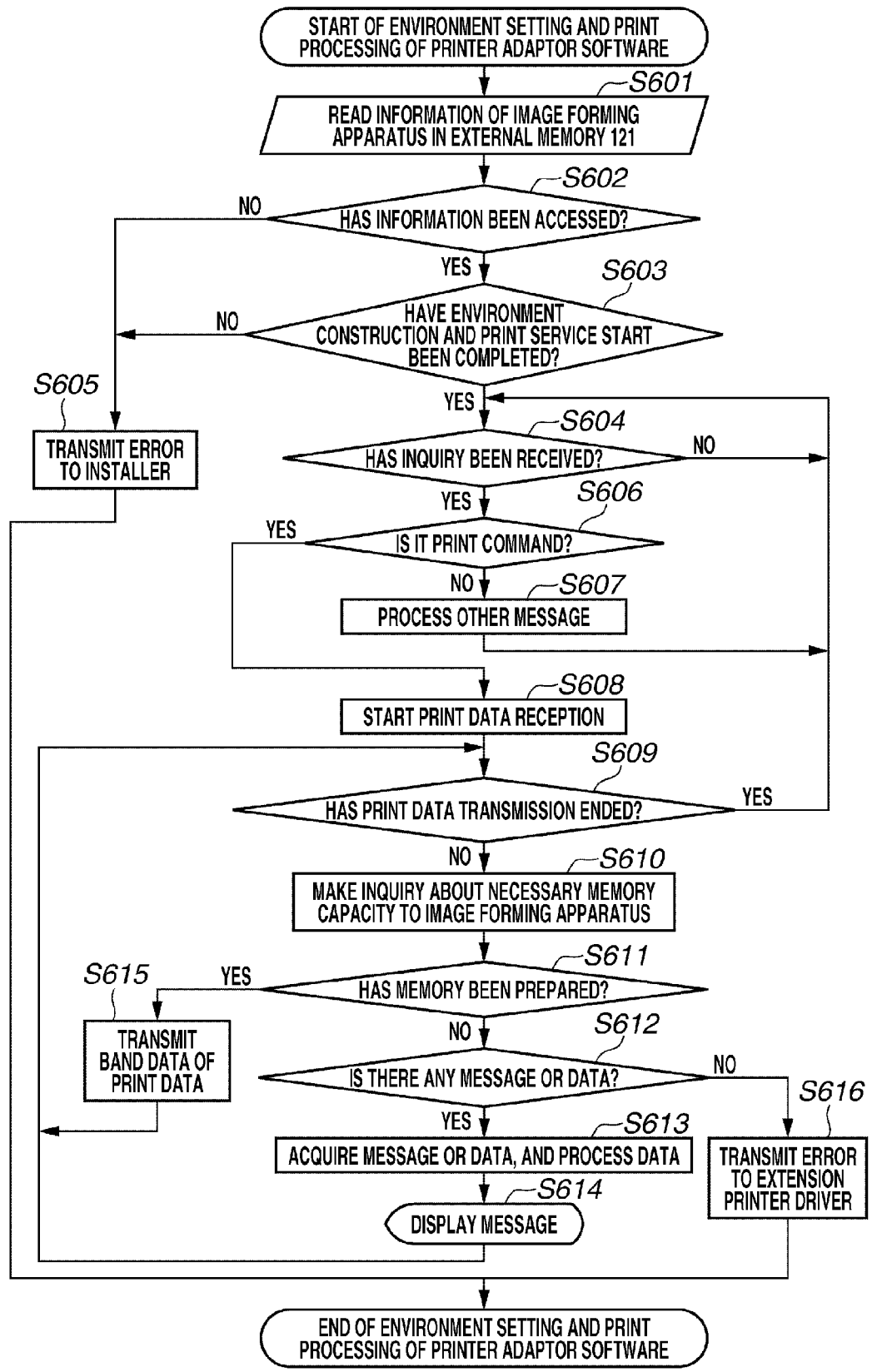
FIG. 6 is a flowchart illustrating environment setting and printing processing of the printer adaptor according to this exemplary embodiment.

Then, the processing proceeds to step S408 to check whether the printer adaptor 129 has been normally installed by receiving a response from the printer adaptor 129. If an error or timeout occurs, the processing proceeds to step S410. In step S410, the installer 125 displays a message that an environment setting having the bidirectional communication of this exemplary embodiment has failed to be constructed, on the display 120. If it is determined that the printer adaptor has successfully been installed (YES in step S408), a screen 600 of "optimal environment has been constructed" indicating environment construction completion to the user, similar to that of the exemplary embodiment illustrated in FIG. 6 is displayed on the display 120 to end the processing.

Figure 15A:
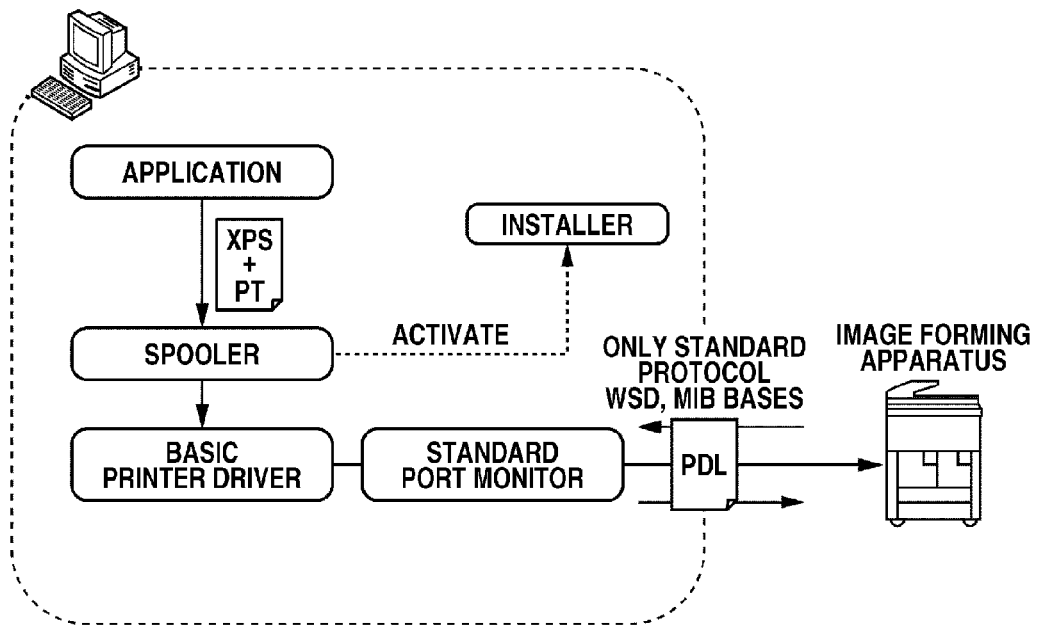
FIG. 15A illustrates a system configuration before setting and a configuration after setting.
Figure 15B:
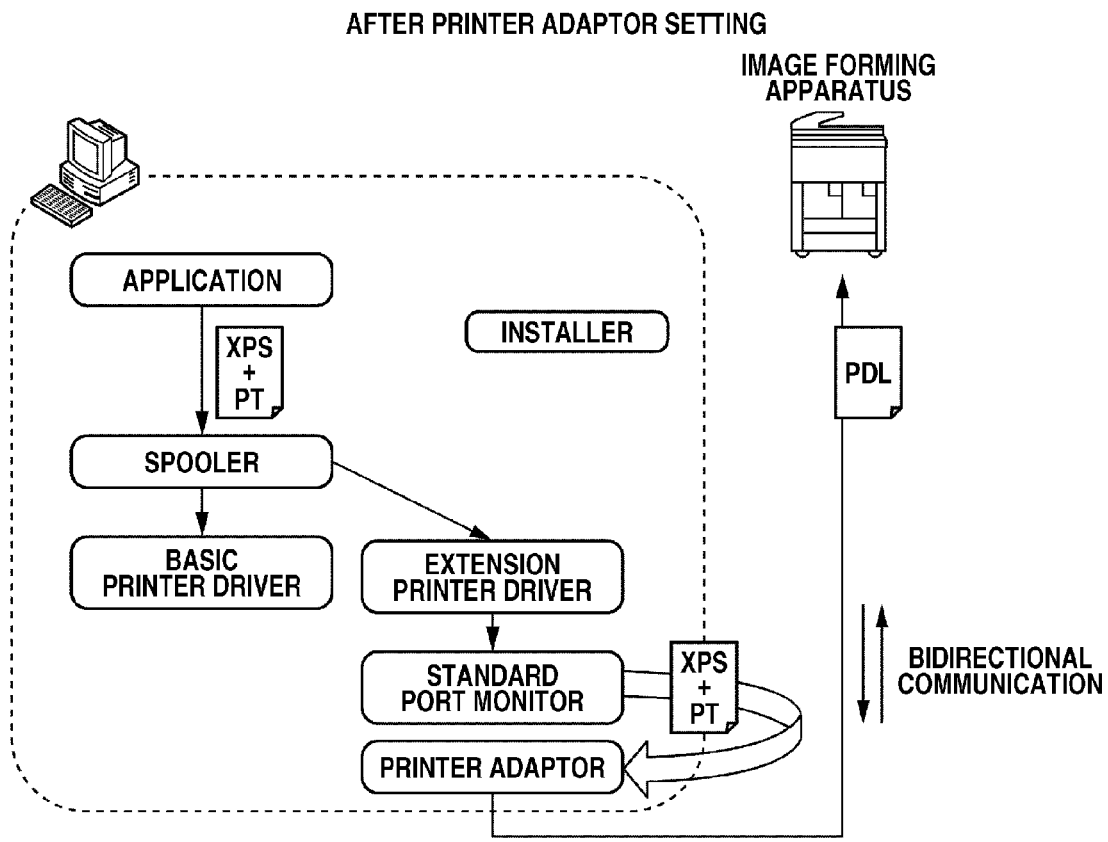
FIG. 15B illustrates a system configuration before setting and a configuration after setting.

FIG. 15B illustrates a system configuration after the printer adaptor has been set. When the basic printer driver is installed in the printing system restricted on the standard bidirectional communication, the restriction is automatically detected, and the installer acquires the information of the target image forming apparatus (IP address) from the basic driver to install and activate the printer adaptor. Further, the extension printer driver corresponding to the printer driver can be operable by the installer. As a result, an environment where the extension printer driver executes original bidirectional communication with the target image forming apparatus via the printer adaptor is automatically created.

Figure 5:
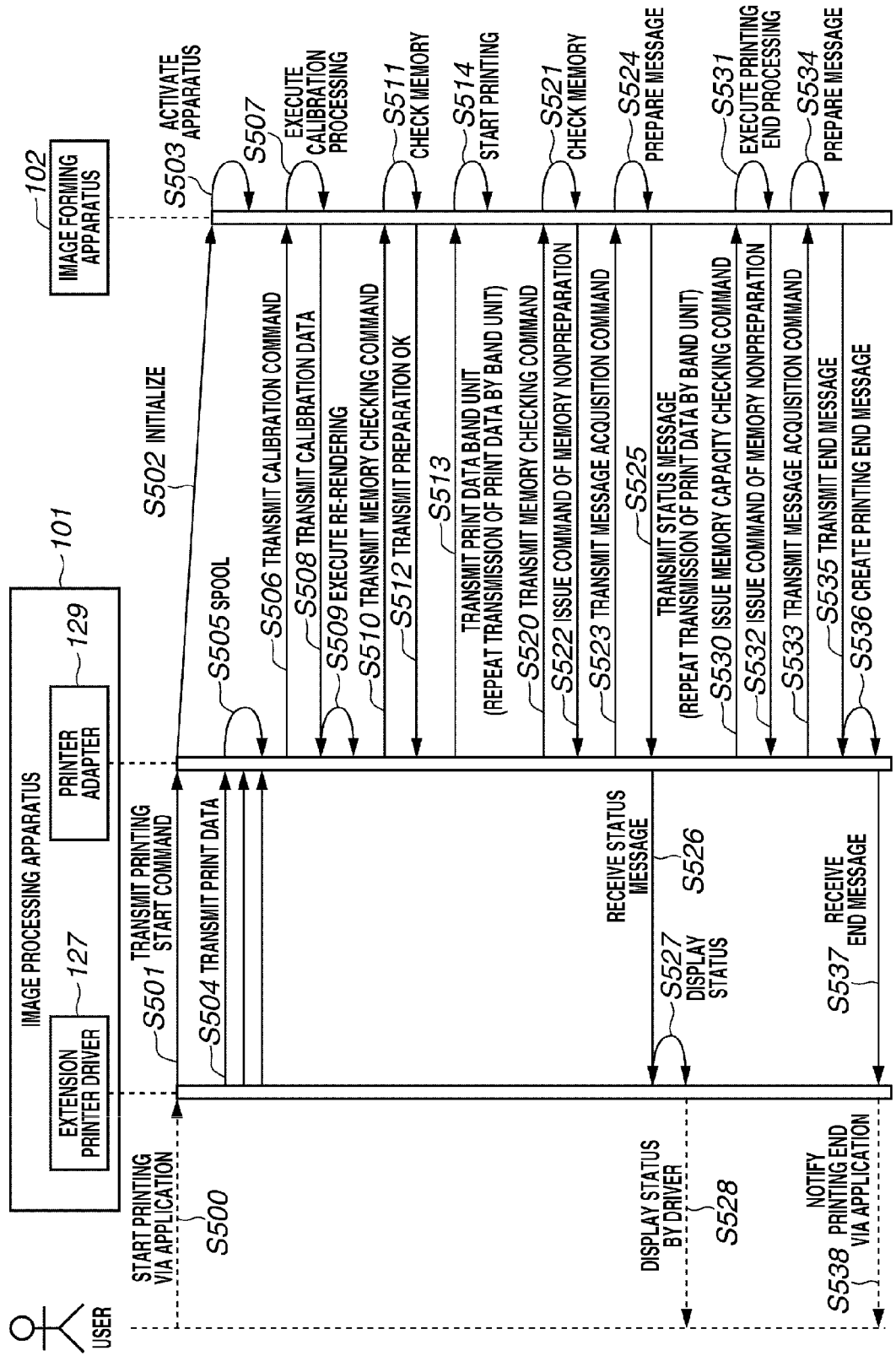
FIG. 5 is a flowchart illustrating bidirectional communication processing of a printer adaptor according to this exemplary embodiment.

FIG. 5 illustrates a printing sequence of the printing system corresponding to the bidirectional communication according to this exemplary embodiment. An example of a sequence is illustrated concerning how the printing system constructed by executing the automatic installation processing to construct the bidirectional communication environment illustrated in FIG. 4 carries out printing processing by using the bidirectional communication between the image forming apparatus 102 and the information processing apparatus 101.

The extension printer driver 127, which recognizes the printer adaptor 129 as a target image forming apparatus, behaves to cause the apparatus to execute printing. When a printing request is received from the extension printer driver 127, the printer driver 129 executes printing processing in the environment-constructed image forming apparatus 102 as in the case of the conventional printer driver. First, in step S500, the user designates the extension printer driver 127 from the application to start printing.

In step S501, the extension printer driver 127 transmits a printing start command to the printer adaptor 129. In step S502, the printer adaptor 129 transmits an initialization command to the image forming apparatus 102. In step S503, the image forming apparatus 102 is activated. Simultaneously, in step S504, the extension printer driver 127 transmits print data to the printer adaptor 129. In step S505, the printer adaptor 129 spools the print data. Then, the processing proceeds to step S506. This processing can be executed simultaneously with the spool processing of step S505.

In step S506, a calibration command is transmitted to the image forming apparatus 102. In step S507, the image forming apparatus 102 executes calibration processing. In step S508, the image forming apparatus 102 transmits its result to the printer adaptor 129. The processing then proceeds to step S509 to execute image adjustment such as re-rendering for the print data spooled in step S505 based on the calibration result. In step S510, a memory checking command is transmitted to the image forming apparatus 102. In step S511, the image forming apparatus 102 executes memory checking. This is the processing in steps S305 and S306 illustrated in FIG. 3.

In step S512, preparation OK is transmitted to the printer adaptor 129. In step S513, the print data is transmitted by band to the image forming apparatus 102. After reception of the print data, in step S514, the image forming apparatus 102 starts printing processing. The processing of steps S510 to S513 is repeated as processing by a band, and the printing processing is accordingly executed in bidirectional communication. During the printing, as an example of a message, when the printer adaptor 120 issues a memory checking command in step S520, in step S521, the image forming apparatus 102 executes memory checking.

When there is the message, in step S522, a command indicating that the memory is not ready is issued. When the printer adaptor 129 receives this command, in step S523, an acquisition command such as a message or data is transmitted to the image forming apparatus 102. In step S524, the image forming apparatus 102 prepares a message. In step S525, the image forming apparatus 102 transmits a status message as an example to the printer adaptor 129. In step S526, the printer adaptor 129 transmits the received status message to the extension printer driver 127. Then, the extension printer driver 127 displays the status.

In step S528, the user can check the status. The printing processing in the bidirectional communication is continued by repeating the processing of steps S510 to S513 on a band-by-band basis, and then the processing proceeds to step S530. When the printer adaptor 129 issues the memory checking command, in step S531, the image forming apparatus 102 determines, as in the case of the processing of step S304 illustrated in FIG. 3, the end of printing to execute printing end processing.

In step S532, a command indicating that the memory is not ready is issued. When the printer adaptor 129 receives this command, in step S533, an acquisition command such as a message or data is transmitted to the image forming apparatus 102. In step S524, the image forming apparatus 102 prepares a message. In step S525, the image forming apparatus 102 transmits an end message to the printer adaptor 129. In step S536, for the received end message, the printer adaptor 129 creates a printing end message for the extension printer driver 127. In step S537, the printer adaptor 129 transmits the end message to the extension driver 127. When the extension printer driver 127 receives the end message in step S537, in step S538, the application is notified of the printing end. Thus, the user can confirm the printing processing end.

FIG. 6 is a flowchart illustrating an example of environment setting processing and printing processing of the printer adaptor 129 according to this exemplary embodiment. First, the printer adaptor 129 is installed in the RAM 112 of the information processing apparatus 101 by the automatic installation processing of the basic printer driver 126 and the installer 125 illustrated in FIG. 4, and activated to start the processing. In step S601, the printer adaptor 129 reads the information of the target image forming apparatus written beforehand in step S404 illustrated in FIG. 4 from the user file or the registry of the external memory 121. The information of the target image forming apparatus 102 is information of a local port in the case of a local connection such as an IP address or a USB.

Then, in step S602, it is determined whether the printer adaptor 129 has successfully read the information of the image forming apparatus. When it has not read the information (NO in step S602), the processing proceeds to step S605. The printer adaptor 129 transmits an error to the installer 125. When it is determined that the printer adaptor 129 has successfully read the information of the image forming apparatus (YES in step S602), the processing proceeds to step S603. The printer adaptor 129 executes environment creation, emulation, and printing service start processing to acquire information from the image forming apparatus 102 by the conventional bidirectional communication method. When the processing is not completed due to a processing failure, the processing proceeds to step S605. The printer adaptor 129 transmits an error to the installer 125.

When the processing is completed, the printer adaptor 129 normally functions to support printing processing, thereby completing the environment setting processing. Next, the processing proceeds to step S604, which is printing start processing.

The printing processing will be described. In step S604, the printer adaptor 129 continuously checks whether any inquiry has come from the extension printer driver 127. When the inquiry is received (YES in step S604), the processing proceeds to step S606. In step S606, it is determined whether the inquiry is a printing command. When it is the printing command (YES in step S606), the processing proceeds to step S608. When it is not the printing command (NO in step S606), the processing proceeds to step S607. In step S607, other message processing for executing necessary communication by a standard protocol is executed, and then the processing returns to step S604.

The processing performed when the inquiry is the printing command will be described. In step S608, the printer adaptor 129 starts to receive print data, and the print data is continuously received in the printer adaptor 129. The processing proceeds to step S609. When the printing processing is currently executed, the printer adaptor checks whether data has been transmitted. When transmission of print data has been ended (YES in step S609), the printer adaptor 129 is notified of an end message from the image forming apparatus 102, and this processing is accordingly ended.

When there is still print data (NO in step S609), the processing proceeds to step S610, and the printer adaptor 129 makes an inquiry about whether a necessary memory area has been prepared in the image forming apparatus 102. Depending on an image forming apparatus, there is a limit on the amount of print data to be transmitted once. It is accordingly presupposed that certain band data be transmitted in all areas for the printing paper of the print data.

When a sufficient memory area has been prepared (YES in step S611), the processing proceeds to step S615, and the printer adaptor 129 transmits the band data of the print data to the image forming apparatus 102. The processing then returns to step S609. When no sufficient memory has been prepared (NO in step S611), it means that there is information from the image forming apparatus in bidirectional communication. Thus, in step S612, the printer adaptor 612 checks whether there is a message or data, with the image forming apparatus.

When there is no message or data (NO in step S612), it is determined that a communication state is illegal and the processing proceeds to step S616 to transmit an error to the extension printer driver 102. When there is a message (YES in step S612), the processing proceeds to step S613. The printer driver 129 acquires the message or the data from the image forming apparatus 102, and executes data processing such as calibration based on the data from the image forming apparatus 102. Then, the processing proceeds to step S614 and the printer adaptor 129 displays a message. Then, the processing returns to step S609.

Figure 7:
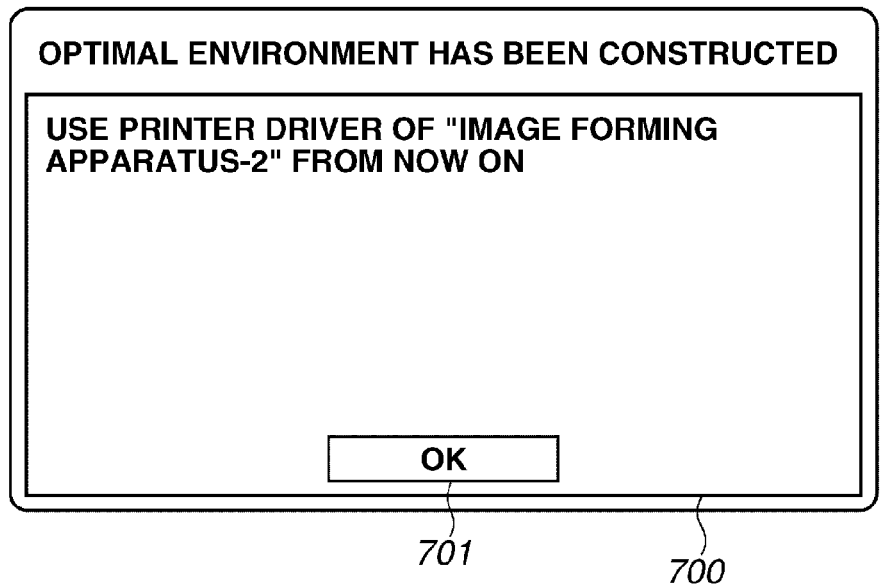
FIG. 7 illustrates a user interface example of an environment construction notification of a bidirectional communication printing system according to this exemplary embodiment.

FIG. 7 is a screen 700 of "optimal environment has been created" indicating completion of environment creation to the user when the printer adaptor 129 has successfully been installed in step S408 illustrated in FIG. 4. When the user presses an OK button 701, all the steps of the automatic installation processing to create the bidirectional communication environment of the basic printer driver 126 and the installer 125 are ended.

Next, a second exemplary embodiment of the present invention is described.

Figure 8A:
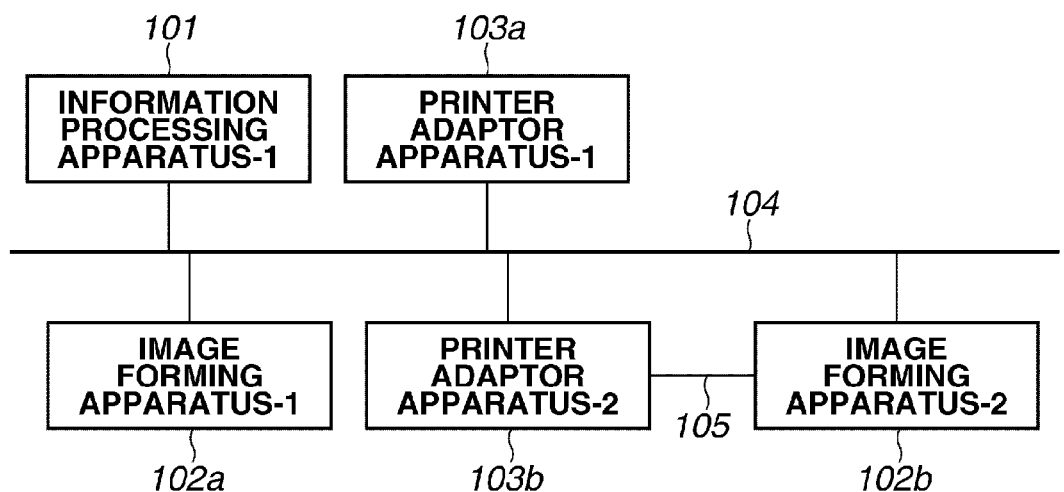
FIG. 8A is a block diagram illustrating a configuration of a system and apparatus configurations in an image processing apparatus and an image forming apparatus according to a second exemplary embodiment.

FIG. 8A is a block diagram schematically illustrating a configuration of a network system according to the second exemplary embodiment of the present invention. As in the case of the system illustrated in FIG. 1A, this network system includes an image processing apparatus 101, and a plurality of image forming apparatuses (102a, 102b, . . . ) that receive print data from the image processing apparatus 101 to execute printing. The network system further includes printer adaptors (103a, 103b . . . ). The printer adaptor 103 may be connected to the image forming apparatus 102 via a local area network 104 based on Ethernet (registered trademark) or via a local bus 105 such as a USB.

Figure 8B:
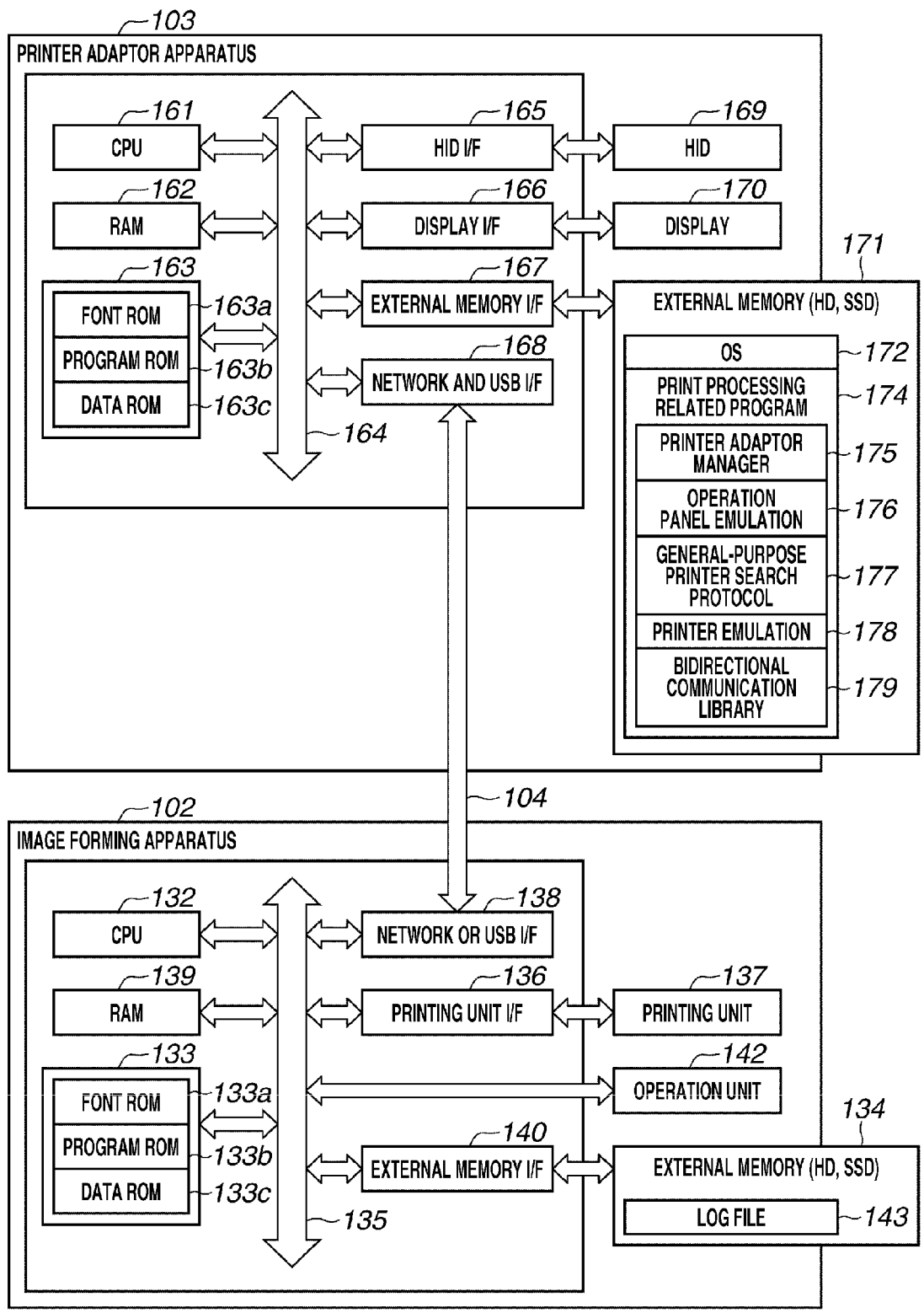
FIG. 8B is a block diagram illustrating a configuration of a system and apparatus configurations in an image processing apparatus and an image forming apparatus according to a second exemplary embodiment.

FIG. 8B is a block diagram illustrating apparatus configurations of the printer adaptor 103 and the image forming apparatus 102. The image forming apparatus 102 is completely same in configuration as that illustrated in FIG. 1B, and thus description thereof is omitted. Particularly, in a program ROM 133b, an additional function is programmed to execute processing of the second exemplary embodiment.

In the printer adaptor 103, a CPU 161 is in overall control of apparatuses connected to a system bus 172 according to a program stored in a RAM 162. The RAM 162 also functions as a main memory or a work area for the CPU 161. A ROM 163 stores various programs and data. A human interface device (HID) I/F 165, which is an interface for a HID, controls a key input from a HID 169 or a pointing device (touch panel, not illustrated). A display I/F 166 controls displaying on a display 170.

An external memory I/F 167 controls access to an external memory 171 such as a flash memory or solid state disk (SSD). The external memory 171 functions as an information processing apparatus readable storage medium for storing an OS program 172, a printing processing related program 174, and a user file or an edit file (not illustrated). The printing processing related program 174 includes a printer adaptor manager 175, an operation panel emulation 176, a general-purpose printer search protocol 177, a printer emulation 178, and a bidirectional communication library 179.

The printer adaptor manager 175 is a module for managing an operation of a printer adaptor. The printer adaptor manager 175 functions to first store a print job transmitted to the target image forming apparatus 102 in the printer adaptor 103, and transmit it to the image forming apparatus 102 while executing management. The operation panel emulation 176 is used for operating the apparatus in place of the operation unit of the image forming apparatus when necessary. The general-purpose printer search protocol 177 has a protocol which is used to be found in image forming apparatus search on the network 104 in place of the printer adaptor 103.

The printer emulation 179 is used when the apparatus is operated as the image forming apparatus. The bidirectional communication library 179 supports not only the conventional bidirectional communication method other than the standard but also the standard bidirectional communication method. A network and a USB I/F 168, which are connected to the image forming apparatus 102 via the network 104 or a local bus such as a USB, carries out communication control processing with the image forming apparatus 102.

Figure 9:
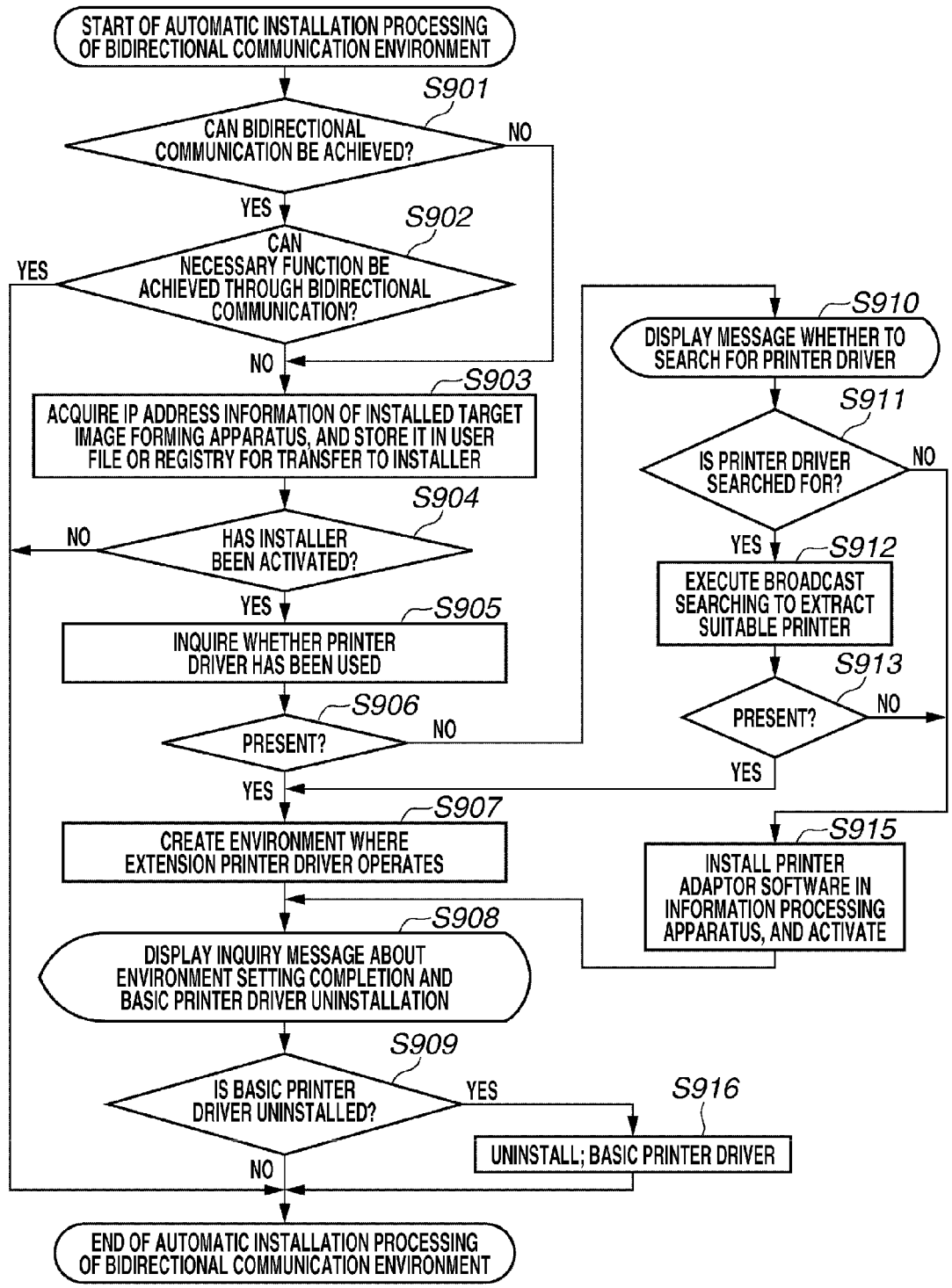
FIG. 9 is a flowchart illustrating an example of automatic installation processing of bidirectional communication environment according to this exemplary embodiment.

FIG. 9 is a flowchart illustrating an example of automatic installation processing to create a bidirectional communication environment of the basic printer driver 126 and the installer 125 in the image forming apparatus 101. First, as a premise, steps of a starting part are similar to those of the example of the automatic installation processing to create the bidirectional communication environment of the basic printer driver 126 and the installer 125 according to the first exemplary embodiment illustrated in the flowchart of FIG. 4. Steps S901 to S904 are similar to steps S401 to S404 illustrated in FIG. 4, and thus description thereof is omitted.

In step S905, after activation of the installer 125 in step S904, an inquiry is made about whether the printer adaptor is already used in the image forming apparatus 102. As an inquiry method, a determination is made whether there is a log file 143 used before by the printer adaptor 103 in the external memory 134 in the image forming apparatus 102. When the presence of the log file 143 is returned from the image forming apparatus 102 (YES in step S906), there is a printer adaptor. The processing then proceeds to step S907 to create an environment where the extension printer driver 127 operates, by the installer 125 according to a response from the printer adaptor. In this exemplary embodiment, the installer 125 copies the file of the extension printer driver 127 to a suitable part of the OS 122, and creates a communication port having setting for the printer adaptor 129 by a standard method of the OS 122.

Figure 12:
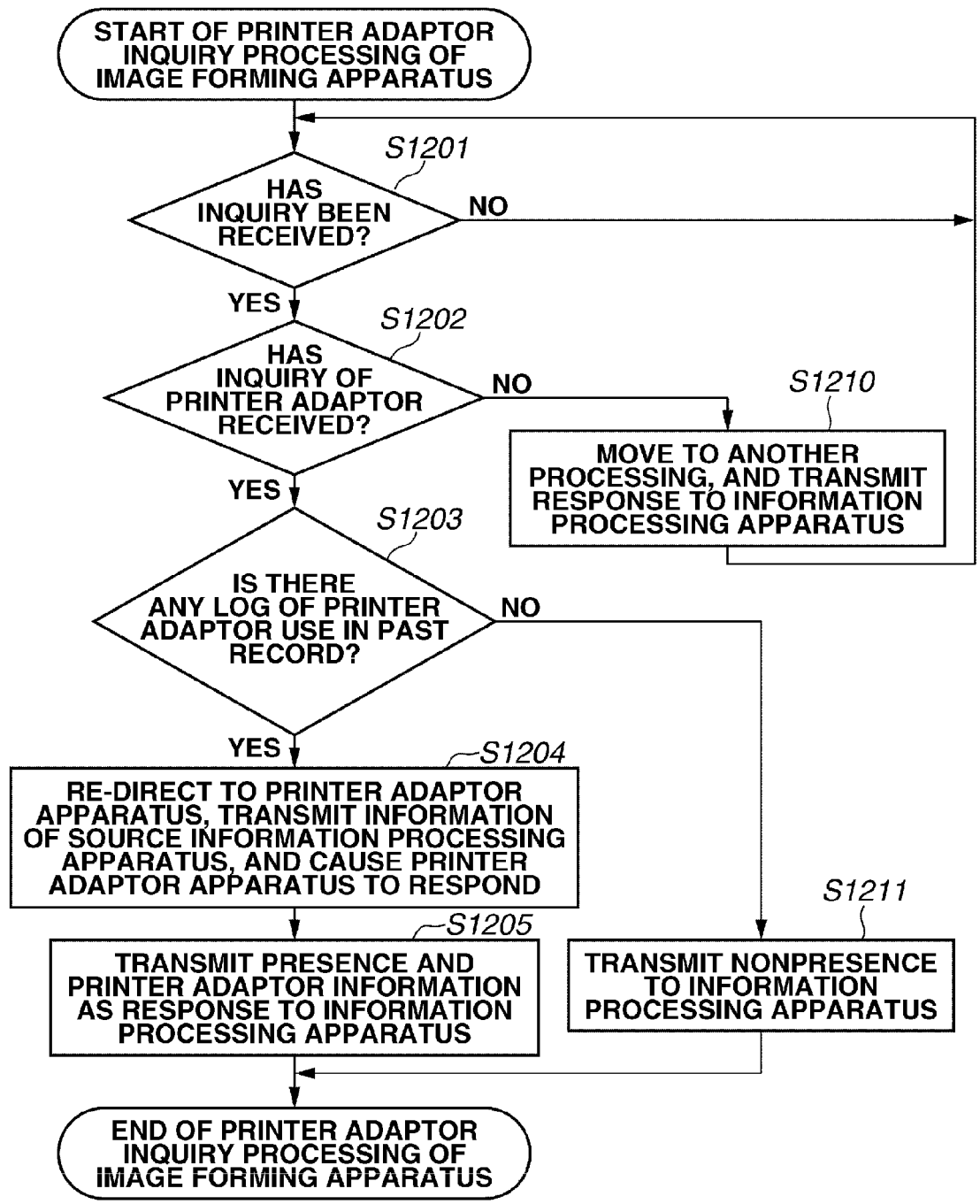
FIG. 12 is a flowchart illustrating inquiry processing of printer adaptor use in the image forming apparatus according to this exemplary embodiment.

When there is no printer adaptor (NO in step S906), the processing proceeds to step S910. In step S901, the installer 125 displays a printer adaptor search selection message to make an inquiry about whether to search for a printer adaptor, to the user on the display 120. FIG. 12 illustrates an example of the printer adaptor search selection message. Then, the processing advances to step S911, and it is determined whether to search for a printer adaptor. When printer adaptor searching is executed (YES in step S911), in step S912, broadcasting is carried out in the network 104. When broadcast searching is executed, a suitable printer is extracted based on the result.

After the processing of step S912 has ended on an end condition such as a timeout, the processing proceeds to step S913. When a suitable printer adaptor is found (YES in step S913), the processing proceeds to step S907. In step S907, setting for connection to the found printer adaptor is made, and the installer 125 creates an environment where the extension printer driver 127 operates. When it is determined that printer adaptor searching is not carried out (NO in step S911) or when a desired printer adaptor is not found (NO in step S913), the processing proceeds to step S915, where the printer adaptor 129 is installed in the information processing apparatus 101 as in the case of the first exemplary embodiment.

Figure 13:
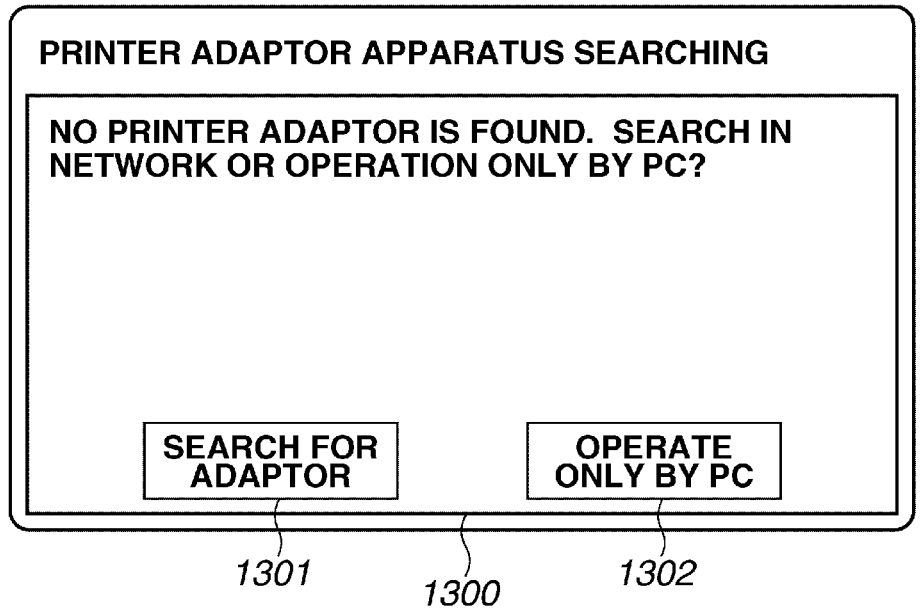
FIG. 13 illustrates a user interface example to search for a printer adaptor to be used.

The operations of steps S405 and S406 illustrated in FIG. 4 are carried out in step S915. After step S907 or S915 ends, the processing proceeds to step S908, where the installer 125 displays a message indicating environment setting has been completed and inquiring about whether to uninstall an original basic printer driver, on the display 120. FIG. 13 illustrates an example of a basic printer driver uninstallation selection message. Then, the processing proceeds to step S909 and it is determined whether to uninstall the basic printer driver.

When the basic printer driver is to be uninstalled (YES in step S909), the processing proceeds to step S916, where the installer 1215 uninstalls the basic printer driver 126 installed in the OS 122. When it is determined that the basic printer driver is not uninstalled (NO in step S909), or when the uninstallation processing is completed in step S916, this automatic installation processing start processing of the bidirectional communication environment is ended.

Figure 10:
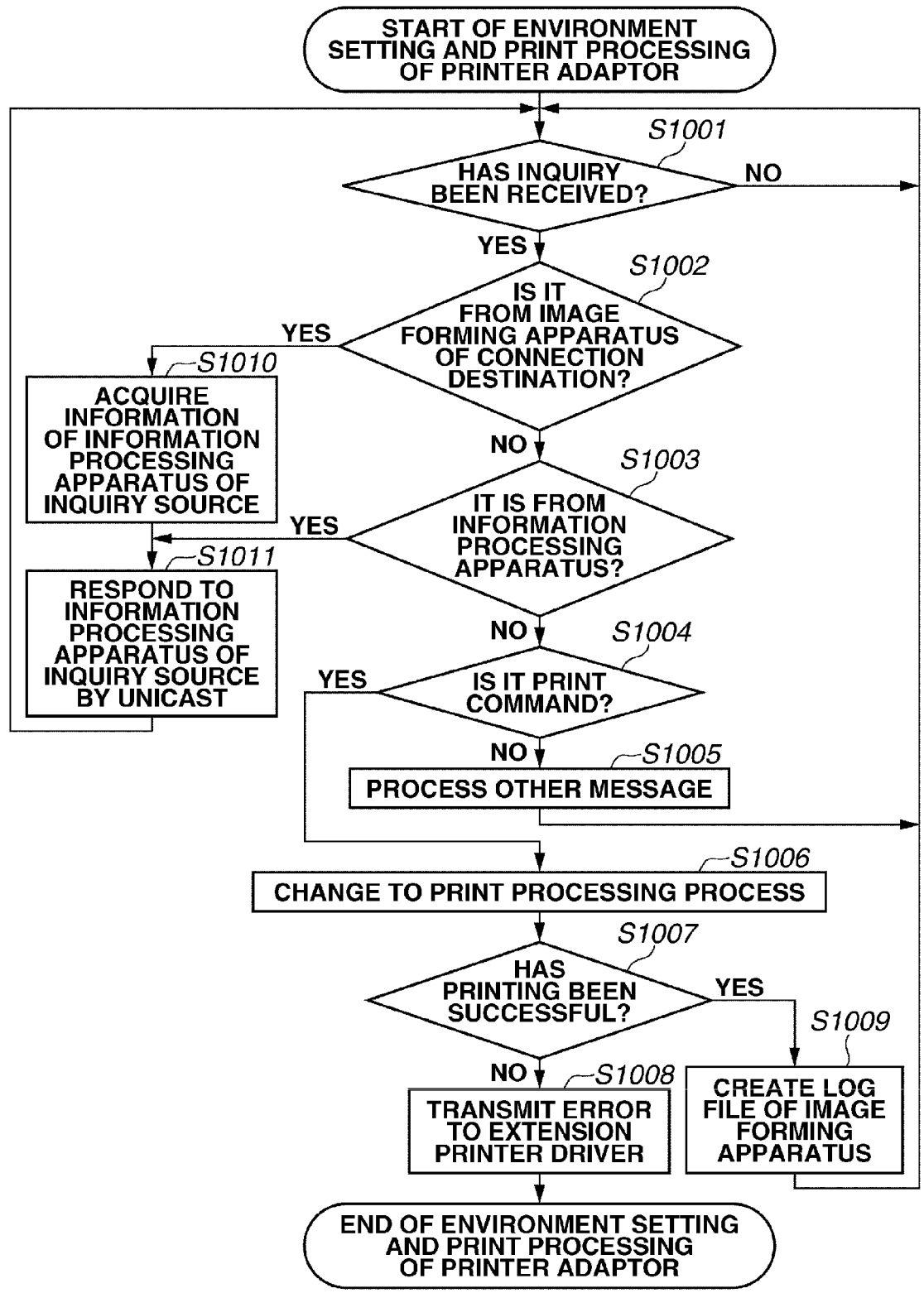
FIG. 10 is a flowchart illustrating inquiry processing of a printer adaptor according to this exemplary embodiment.

FIG. 10 is a flowchart illustrating an example of environment setting processing and printing processing of the printer adaptor 103 according to this exemplary embodiment. The printer adaptor 103, which has been connected to the image forming apparatus 102, is currently used. The processing is started in a state where the printer adaptor manager 175 has been installed in the RAM 162 of the printer adaptor 103 and activated. In step S1001, whether an inquiry has come from the information processing apparatus 101 or an image forming apparatus 102 is continuously checked. When there is an inquiry (YES in step S1001), the processing proceeds to step S1002.

In step S1002, it is determined whether the inquiry is from the image forming apparatus 102 of connection destination. When it is from the image forming apparatus 102 of connection destination (YES in step S1002), the processing proceeds to step S1010 to acquire information of the inquiry source image processing apparatus. When the inquiry is not from the image forming apparatus 102 of connection destination (NO in step S1002), the processing proceeds to step S1003 to determine whether the inquiry is from the information processing apparatus 101. The processing proceeds to step S1011 when it is from the information processing apparatus 101 (YES in step S1003), and to step S1004 when it is not (NO in step S1003).

When it is determined that the inquiry is from the information processing apparatus 101 in step S1010 or step S1003, the processing proceeds to step S1011. A response is then made to the information processing apparatus 101 of inquiry source by unicast using the general-purpose search protocol 177. The installer 125 on the information processing apparatus 101 side is prompted to perform installation processing of the extension printer driver 127 in step S807 as illustrated in FIG. 8.

When the inquiry is not from the information processing apparatus 101 (NO in step S1003), in step S1004, whether the inquiry is a printing command is determined. When the inquiry is a printing command (YES in step S1004), the processing proceeds to step S1006. The processing proceeds to step S1005 when the inquiry is not a printing command (NO in step S1004). In step S1005, other message processing for executing necessary transfer by a standard protocol is executed, and then the processing returns to step S1001.

The processing performed when the inquiry is a printing command, is described below. In step S1006, printing processing is executed. In step S1007, it is checked whether the printing processing has been successfully carried out. When the printing processing has been successful (YES in step S1007), an end message is transmitted from the image forming apparatus 102. In this case, the processing proceeds to step S1009.

When a log file 143 is created or present in the external memory 134 of the image forming apparatus 102, information of this printer adaptor is written, and then the processing returns to step S1001. When the printing processing has not been successful (NO in step S1007), the processing proceeds to step S1008, and an error is transmitted to the extension printer driver 127 to end this processing.

Figure 11:
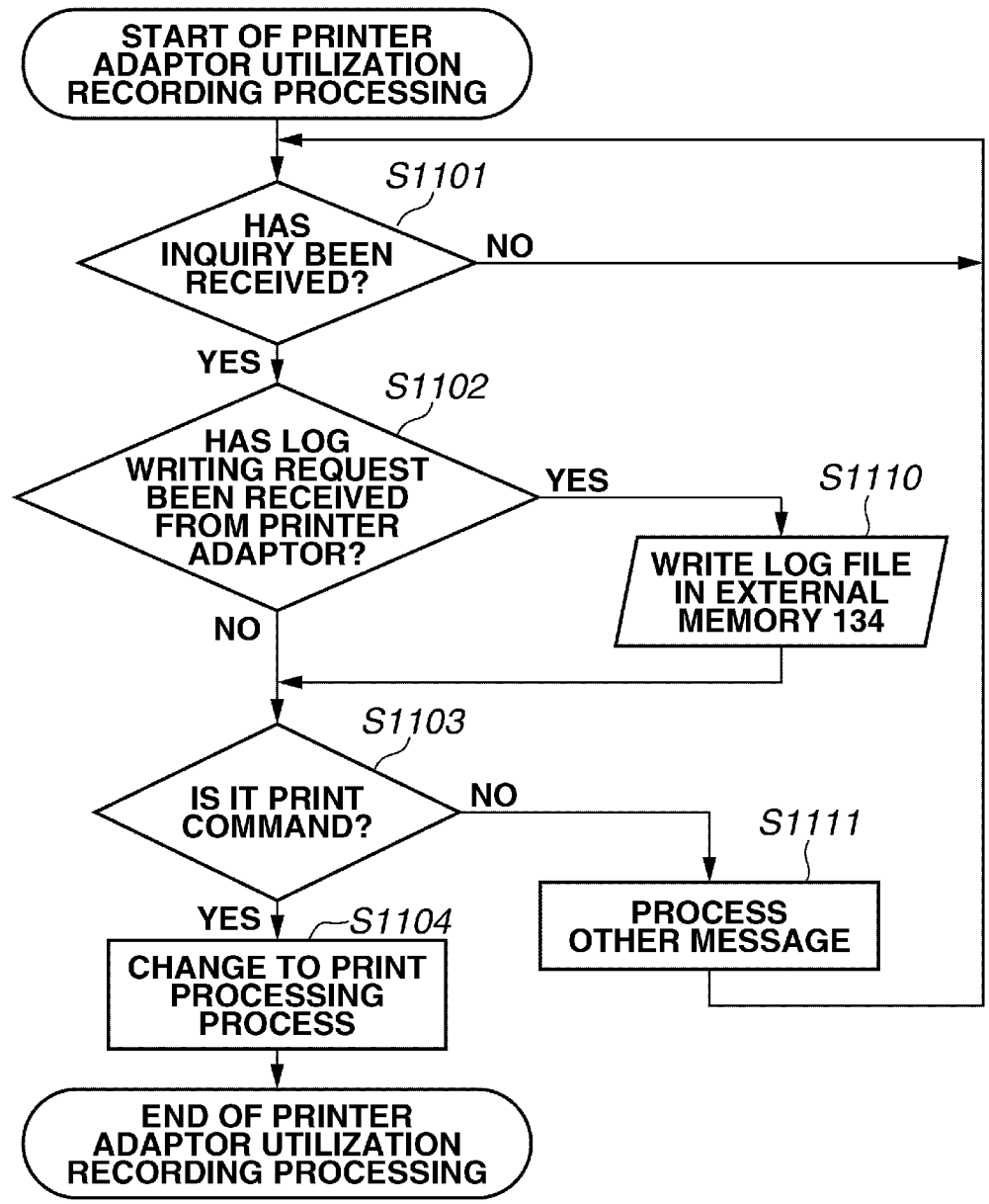
FIG. 11 is a flowchart illustrating record processing of printer adaptor use history in the image forming apparatus according to this exemplary embodiment.

FIG. 11 is a flowchart illustrating an example of use record processing of the image forming apparatus 102 according to this exemplary embodiment. The printer adaptor 103 of this exemplary embodiment, which has been connected to the image forming apparatus 102, is currently used. However, this processing is effective particularly when the apparatus is connected for the first time. In step S1101, it is continuously checked whether an inquiry has come from the information processing apparatus 101 or an image forming apparatus 102. When there is an inquiry (YES in step S1101), the processing proceeds to step S1102.

In step S1102, it is determined whether a log writing request has come from the printer adaptor. When a log writing request has come from the printer adaptor (YES in step S1102), the processing proceeds to step S1110. When there is no log wiring request in the external memory 134 (NO in step S1102), a log file 143 is created. When a log file 143 has been created, information of the inquiry source printer adaptor 103 is written in the log file 143. When there is no inquiry (NO in step S1102), the processing proceeds to step S1103 to determine whether the inquiry is a printing command.

When the inquiry is a printing command (YES in step S1103), the processing proceeds to step S1104. The processing proceeds to step S1111 when the inquiry is not a printing command (NO in step S1103). In step S1111, other message processing for executing necessary transfer by a standard protocol is executed, and then the processing returns to step S1101. When the inquiry is a printing command (YES in step S1103), the processing proceeds to step S1104, and printing processing is executed to end this processing.

FIG. 12 is a flowchart illustrating an example of inquiry processing of the image forming apparatus 102 according to this exemplary embodiment. The printer adaptor 103 of this exemplary embodiment, which has been connected to the image forming apparatus 102, is currently used. This processing is particularly for the image processing apparatus 101 that makes an inquiry for the first time.

In step S1201, whether an inquiry has come from the information processing apparatus 101 or the printer adaptor 103 is continuously checked. When there is an inquiry (YES in step S1201), the processing proceeds to step S1202. In step S1202, it is determined whether an inquiry has come from the printer adaptor 103. When an inquiry has not come (NO in step S1202), the processing proceeds to step S1210 to execute another necessary processing, and transmits a response to the information processing apparatus 101 or the printer adaptor 103 and returns to step S1201.

When an inquiry has come from the printer adaptor 103 (YES in step S1202), the processing proceeds to step S1203 to determine whether there is information regarding the printer adaptor 103 by referring to the log file 143 in the external memory 134. When there is no log file 143 in the external memory 134 (NO in step S1203), the processing proceeds to step S1211, where a response of nonpresence is transmitted to the information processing apparatus to end this processing.

When there is information of the printer adaptor 103 in the log file 143 (YES in step S1203), the processing proceeds to step S1204. Then, an inquiry message is redirected to the printer adaptor 103 to notify of information such as an IP address of the inquiry source information processing apparatus 101. As in the case of step S911 illustrated in FIG. 9, the printer adaptor 103 transmits a response to the information processing apparatus 101. Then, the processing proceeds to step S1205 and presence and information such as an IP address of the printer adaptor 103 are transmitted as a response to the information processing apparatus to end this processing.

FIG. 13 illustrates a screen 1300 of "printer adaptor searching" to make an inquiry about whether to search for a printer adaptor, to the user in step S910 illustrated in FIG. 9. When the installer 125 displays the screen on the display 120, and the user presses an "adaptor selection" button 1301, the searching for a printer adaptor is started. In step S912, broadcast searching is carried out in the network 104. When the user presses an "operate only by PC" button 1302, no searching for a printer adaptor is carried out. The processing then proceeds to step S915, where the installer 125 installs the printer adaptor 129 in the information processing apparatus 101 as in the case of the first exemplary embodiment.

Figure 14:
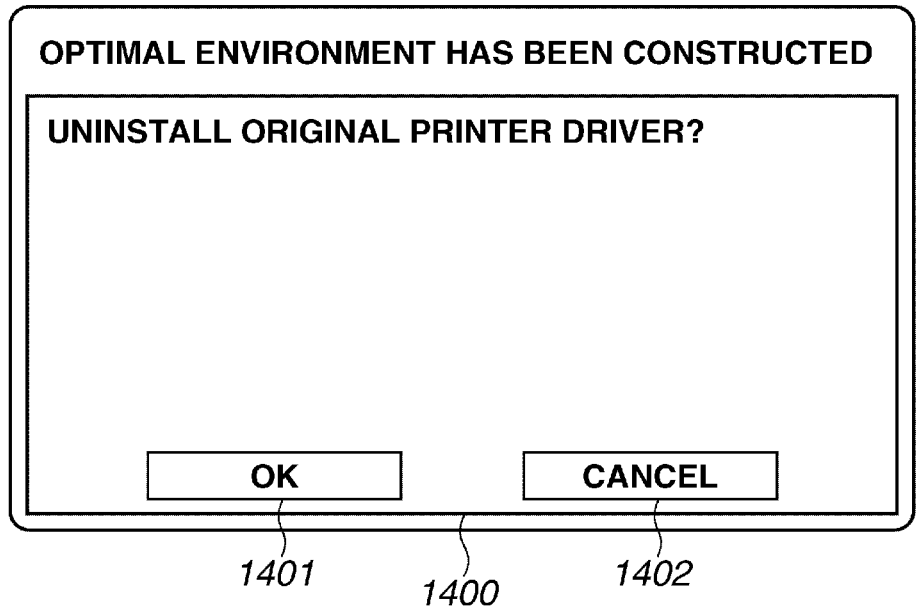
FIG. 14 illustrates a user interface example to select whether to uninstall an original basic printer driver.

FIG. 14 illustrates a screen 1400 of "optimal environment has been created" to notify completion of environment setting and to inquire about whether to uninstall an original basic printer driver in step S908 illustrated in FIG. 9. When the installer 125 displays the screen on the display 120, and the user presses an OK button 1401, the processing proceeds to step S916, where the installer 125 uninstalls the basic printer driver 126 installed in the OS 122. When the user presses the cancel button 1402, the processing proceeds to step S909, where the basic printer driver 126 is not uninstalled.

According to this exemplary embodiment, even when the information processing apparatus includes a system unable to execute bidirectional communication, by the bidirectional communication module constructed by the installer where the basic printer driver is automatically activated, the work of constructing the image forming apparatus and its operation system is automatically started.

As a result, the user can use, without being forced to carry out work such as printing system or environment setting beforehand on the information processing apparatus side or the local network side, the printing function based on the conventional bidirectional communication method, only by installing the basic printer driver even in the case where the user utilizes an image forming apparatus for the first time.

The exemplary embodiment provides a simpler configuration to the user because another printer adaptor is unnecessary. Even when a printer adaptor has been already present, this apparatus can be easily found to be used because the image forming apparatus assists searching.

According to the exemplary embodiment of the present invention, a method in place of the conventional bidirectional communication method can be instantly provided by the information processing apparatus. Even when there are various OS and environment, by preparing the printer drivers and the installers of both the existing technology and the present invention, the image forming apparatus supporting the conventional bidirectional communication system can flexibly and easily use the printer driver that affects the type and the structure of the OS. Thus, chances and environments for using the image forming apparatus of the conventional type will be set up also in the future.

According to the exemplary embodiment of the present invention, even in the printing system where only the standard printing protocol operates, functions supporting memory checking, calibration, and image forming apparatus information, which have been achieved until now by the independent communication protocol, can be realized.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-112600 filed May 19, 2011, which is hereby incorporated by reference herein in its entirety.

The invention claimed is:

1. An information processing apparatus comprising:
an acquisition unit configured to acquire information of a target image forming apparatus from a basic printer driver;
an activation unit configured to install and activate a printer adaptor for achieving bidirectional communication based on the information of the target image forming apparatus acquired by the acquisition unit; and
a creation unit configured to create an environment where an extension printer driver corresponding to the printer adaptor activated by the activation unit operates, wherein
the extension printer driver transmits print data to the printer adaptor according to a printing instruction from an application;
and the printer adaptor spools the print data, and transmits data to the image forming apparatus while executing original bidirectional communication,
wherein when there is no printer adaptor in the image forming apparatus, the activation unit installs and activates the printer adaptor for achieving the bidirectional communication based on the information of the target image forming apparatus acquired by the acquisition unit.

2. The information processing apparatus according to claim 1, wherein when there is a printer adaptor in the image forming apparatus, the creation unit creates the environment where the extension printer driver corresponding to the printer adaptor present in the image forming apparatus operates.

3. An information processing method comprising:
acquiring information of a target image forming apparatus from a basic printer driver:
installing and activating a printer adaptor for achieving bidirectional communication based on the information of the target image forming apparatus acquired in the acquisition step; and
creating an environment where an extension printer driver corresponding to the activated printer adaptor operates, wherein
the extension printer driver transmits print data to the printer adaptor according to a printing instruction from an application; and
the printer adaptor spools the print data, and transmits data to the image forming apparatus while executing original bidirectional communication,
wherein in the activation, when there is no printer adaptor in the image forming apparatus, the printer adaptor for achieving the bidirectional communication based on the acquired information of the target image forming apparatus is installed and activated.

4. The information processing method according to claim 3, wherein in the creation, when there is a printer adaptor in the image forming apparatus, the environment where the extension printer driver corresponding to the printer adaptor present in the image forming apparatus operates is created.

5. A non-transitory computer readable medium causing a computer to perform operations comprising:
acquiring information of a target image forming apparatus from a basic printer driver.
installing and activating a printer adaptor for achieving bidirectional communication based on the acquired information of the target image forming apparatus; and
creating an environment where an extension printer driver corresponding to the activated printer adaptor operates, wherein the extension printer driver transmits print data to the printer adaptor according to a printing instruction from an application; and
the printer adaptor spools the print data, and transmits data to the image forming apparatus while executing original bidirectional communication,
wherein in the activation, when there is no printer adaptor in the image forming apparatus, the printer adaptor for achieving the bidirectional communication based on the acquired information of the target image forming apparatus is installed and activated.

6. The medium according to claim 5, wherein in creating the environment, when there is a printer adaptor in the image forming apparatus, the environment where the extension printer driver corresponding to the printer adaptor present in the image forming apparatus operates is created.

* * * * *